United States Patent
Kwon

(10) Patent No.: US 9,537,349 B2
(45) Date of Patent: Jan. 3, 2017

(54) POWER SUPPLY SYSTEM HAVING AN EMERGENCY POWER SUPPLY CUTOFF FUNCTION

(75) Inventor: Jae-Wook Kwon, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 390 days.

(21) Appl. No.: 14/123,854

(22) PCT Filed: Jun. 4, 2012

(86) PCT No.: PCT/KR2012/004382
§ 371 (c)(1),
(2), (4) Date: Dec. 4, 2013

(87) PCT Pub. No.: WO2012/173348
PCT Pub. Date: Dec. 20, 2012

(65) Prior Publication Data
US 2014/0210269 A1     Jul. 31, 2014

(30) Foreign Application Priority Data
Jun. 13, 2011 (KR) ......................... 10-2011-0057055

(51) Int. Cl.
*H02J 9/06* (2006.01)
*H02J 13/00* (2006.01)

(52) U.S. Cl.
CPC ............... *H02J 9/06* (2013.01); *H02J 13/00* (2013.01); *Y02B 90/222* (2013.01); *Y04S 20/12* (2013.01); *Y10T 307/615* (2015.04)

(58) Field of Classification Search
CPC .............. H02J 9/062; H02J 9/061; H02J 9/06; H02J 9/08; H02J 13/00; H01H 2300/018; Y02B 90/222; Y04S 20/12; Y10T 307/615
(Continued)

(56) References Cited

U.S. PATENT DOCUMENTS 5,612,580 A * 3/1997 Janonis ................ H02J 9/062
307/64
2001/0005894 A1* 6/2001 Fukui ..................... G06F 1/26
713/310
(Continued)

FOREIGN PATENT DOCUMENTS

JP     2000-353031 A    12/2000
KR    10-0521501 B1    10/2005
(Continued)

*Primary Examiner* — Thienvu Tran
*Assistant Examiner* — Brian K Baxter
(74) *Attorney, Agent, or Firm* — Rabin & Berdo, P.C.

(57) ABSTRACT

A power supply system having a power supply cut-off function in an emergency is provided. The present system includes a power supply device for receiving and supplying external input power to a device for power supply, a remote controller for controlling an operation of the power supply device according to a remote control signal from a remote place, an uninterruptible power supply device for supplying operation power to the remote controller, a first line switch for, when a power switch is turned on, supplying the external input power to the power supply device and the uninterruptible power supply device, and a second line switch disposed between the power supply device and the first line switch and cutting off the external input power supplied to the power supply device via the first line switch when the uninterruptible power supply device does not output the power. According to the present invention, even when the remote controller is out of order in the emergency, the power supply of the power supply device can be cut off using the interrupted power supply device to thus enhance stability and reliability of the equipment.

3 Claims, 2 Drawing Sheets

(58) Field of Classification Search
 USPC .......................................................... 307/64
 See application file for complete search history.

(56) References Cited

U.S. PATENT DOCUMENTS

2011/0121781 A1* 5/2011 Burke ....................... H02J 1/06
 320/110
2012/0104855 A1* 5/2012 Yang ......................... H02J 9/00
 307/64

FOREIGN PATENT DOCUMENTS

KR 10-2008-0026231 A 3/2008
KR 10-2010-0131342 A 12/2010

* cited by examiner

POWER SUPPLY SYSTEM HAVING AN EMERGENCY POWER SUPPLY CUTOFF FUNCTION

TECHNICAL FIELD

The present invention relates generally to a power supply system. More particularly, the present invention relates to a power supply system having a power supply cut-off function using an uninterruptible power supply device in emergency.

BACKGROUND ART

Launch Support Test Set (LSTS) receives and monitors power supply and satellite status of a satellite through a launch vehicle when the satellite and the launch vehicle are connected.

In general, on the very day of the satellite launch, the LSTS is disposed in a bunker below a launch vehicle building. When the launch vehicle is launched, the LSTS is controlled remotely from a different building located out of an environment influence.

The LSTS includes a power supply device for supplying power to the satellite and charging a battery of the satellite until the launch. Meanwhile, when an emergency occurs during the launch process, it is necessary to cut off the satellite power supply or to abort the battery charging process.

The LSTS is controlled basically using a remote command. However, when a PC (remote controller) inside the LSTS is out of order, it is impossible to cut off the power supply of the power supply device of the LSTS.

Particularly, when the remote controller is out of order and the power is still supplied to the satellite and the satellite battery in the emergency, it can cause a serious damage.

DETAILED DESCRIPTION OF THE INVENTION

Technical Object of the Invention

To address the above-discussed deficiencies of the prior art, it is a primary aspect of the present invention to provide a power supply system having a power supply cut-off function using an uninterruptible power supply device in an emergency.

Construction and Operation of the Invention

According to one aspect of the present invention, a power supply system having a power supply cut-off function in an emergency includes a power supply device for receiving and supplying external input power to a device for power supply; a remote controller for controlling an operation of the power supply device according to a remote control signal from a remote place; an uninterruptible power supply device for supplying operation power to the remote controller; a first line switch for, when a power switch is turned on, supplying the external input power to the power supply device and the uninterruptible power supply device; and a second line switch disposed between the power supply device and the first line switch and cutting off the external input power supplied to the power supply device via the first line switch when the uninterruptible power supply device does not output the power.

The uninterruptible power supply device may halt power output when a power output cut-off signal is received from the remote place.

The device for the power supply may be a satellite, and the power supply device may include a first power supply for supplying the operation power to the satellite, and a second power supply for supplying power for charging a battery of the satellite.

The first line switch and the second line switch may be magnet switches.

The power supply system may further include an emergency cut-off switch disposed between the uninterruptible power supply device and the second line switch and blocking the external input power from being supplied to the power supply device by turning off the second line switch according to manipulation of an operator.

Effect of the Invention

According to the present invention, even when the remote controller is out of order in the emergency, the power supply of the power supply device can be cut off using the uninterruptible power supply device to thus enhance stability and reliability of the equipment.

THE BRIEF DESCRIPTION OF THE DRAWINGS

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Figure 1:
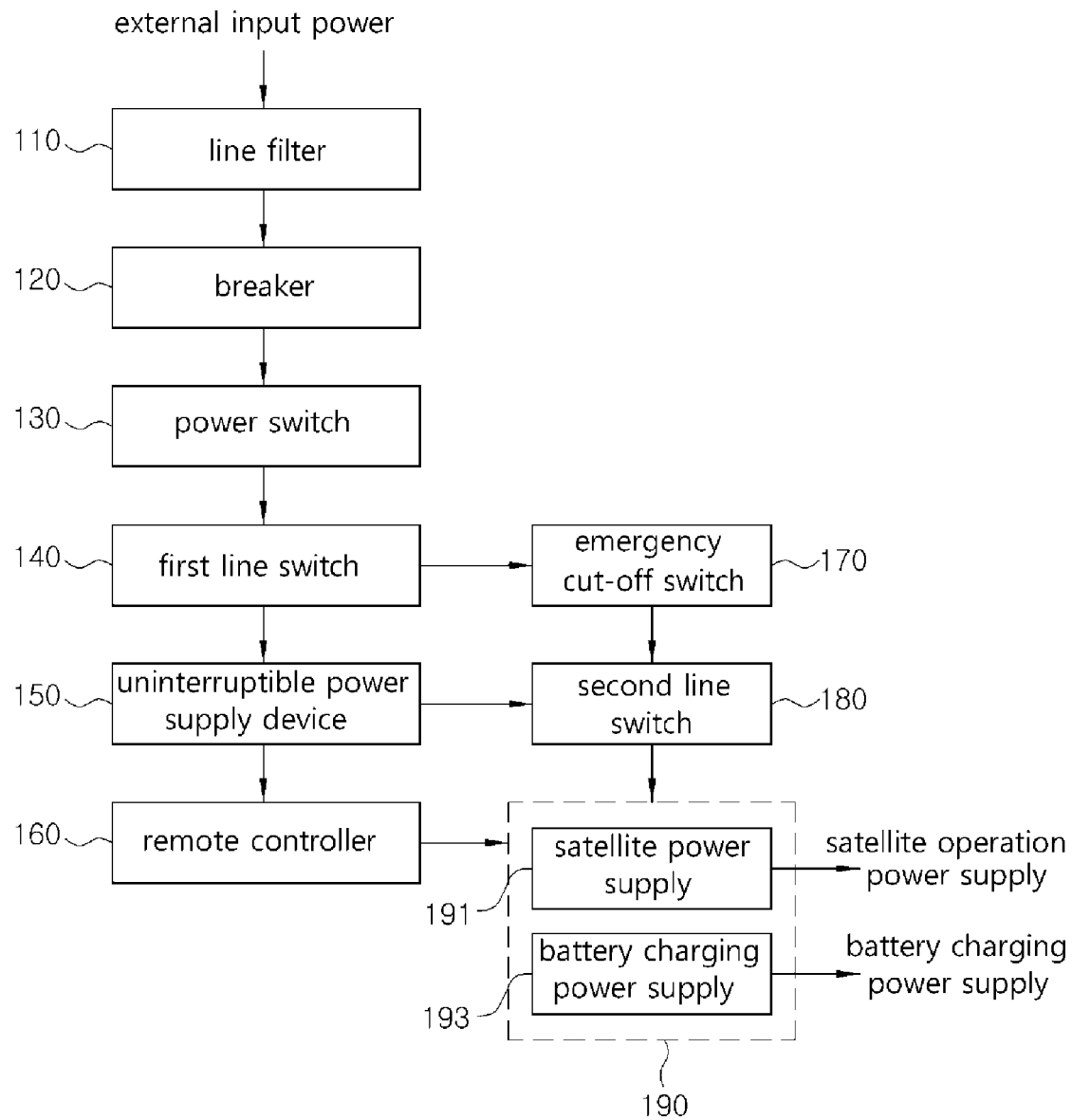
FIG. 1 is a diagram of a Launch Support Test Set (LSTS) according to an exemplary embodiment of the present invention.

FIG. 1 is a diagram of a Launch Support Test Set (LSTS) according to an exemplary embodiment of the present invention.

Referring to FIG. 1, the LSTS 100 can receive and monitor power supply of a satellite (not shown) and satellite status through a launch vehicle (not shown).

The LSTS 100 can include a line filter 110, a breaker 120, a power switch 130, a power supply device 190, an uninterruptible power supply device 150, a remote controller 160, a first line switch 140, a second lien switch 180, and an emergency cut-off switch 170. The power supply device 190 can include a power supply 191 for satellite power supply and a power supply 193 for battery charging.

The line filter 110 can block noise from flowing into the satellite power supply 191 and the battery charging power supply 193. Herein, an external input power can supply single-phase power of AC 220V.

The breaker 120 breaks current flow to prevent an accident caused by overcurrent, that is, current over a rated current in the LSTS 100.

The power switch 130 supplies or cuts off the external input power supplied via the breaker 120, to the satellite power supply 191 and the battery charging power supply 193 according to an operator's selection.

The power supply 190 receives, converts, and supplies the external input power for the satellite ready to launch. The satellite power supply 191 supplies operation power to the satellite, and the battery charging power supply 193 supplies the power for charging the satellite battery.

The uninterruptible power supply device 150 supplies a stabilized alternating power of good quality by overcoming a power failure of the external input power, that is, the commercial power.

In particular, the uninterruptible power supply device 150 not only supplies the necessary power to the remote controller 160 but also includes a network communication module (not shown) for sending and receiving data and a control signal to and from a remote place. The uninterruptible power supply device 150 can autonomously halt the power output when a power output cut-off signal is received from the remote place.

The remote controller 160 remotely controls operations of the components of the LSTS 100 according to the control signal from the remote place. Particularly, the remote controller 160 controls the operation of the power supply device 190 according to a remote control signal from the outside. More specifically, the remote controller 160 can turn on or off the satellite power supply 191 and the battery charging power supply 193 according to the remote control signal.

The first line switch 140 supplies the external input power supplied via the breaker 120 to the uninterruptible power supply device 150 and the power supply device 190 when the power switch 130 is turned on, and cuts the external input power supply when the power switch 130 is turned off.

The second line switch 180 is turned on normally and supplies the external input power supplied via the first line switch 140 to the power supply device 190. The second line switch 180 is turned off in the emergency and cuts the power.

More specifically, when the operation's manipulation turns off the emergency cut-off switch 170 or the uninterruptible power supply device 150 halts the power output and pole status of the second line switch 180 is changed, the external input power supply to the satellite power supply 191 and the battery charging power supply 193 is cut off.

Preferably, the first line switch 140 and the second line switch 180 are implemented using a magnet switch so that they can be easily turned on or off remotely by controlling the power switch 130 or the emergency cut-off switch 170.

Now, the power supply cut-off in the LSTS is explained more detail according to an exemplary embodiment of the present invention.

Figure 2:
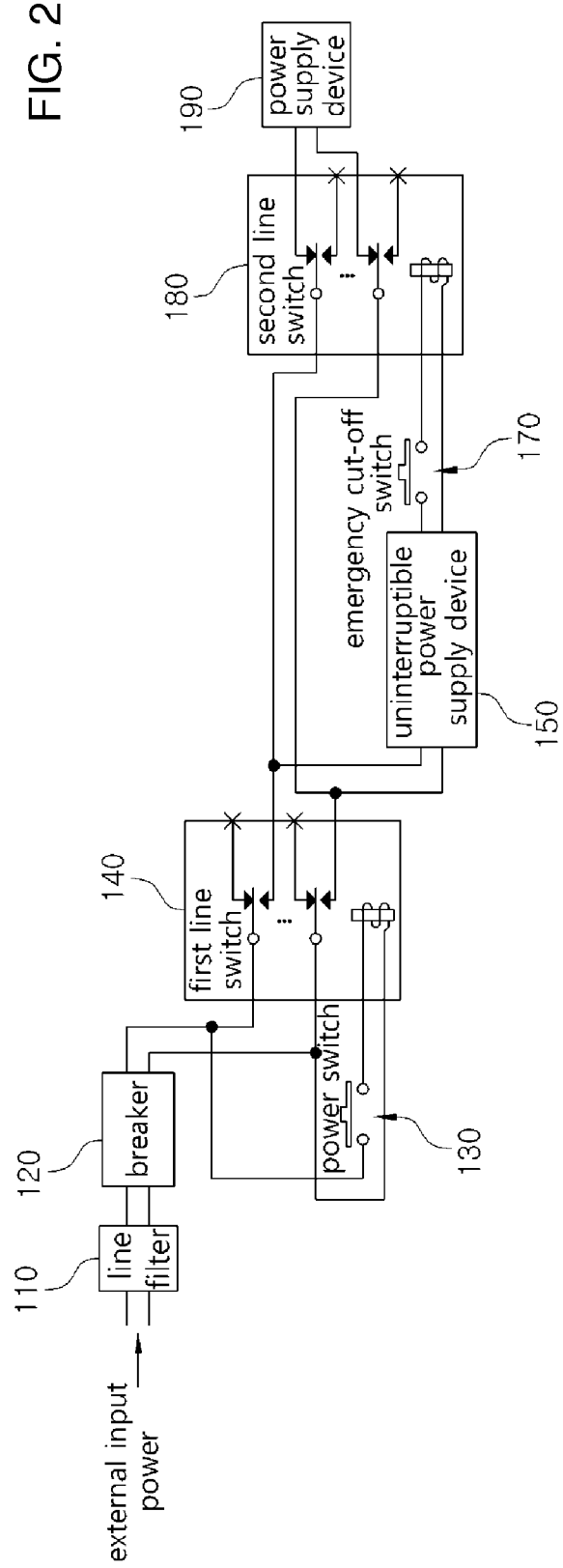
FIG. 2 is a detailed diagram of a power supply route of the LSTS of FIG. 1.

FIG. 2 is a detailed diagram of a power supply route of the LSTS of FIG. 1.

Referring to FIGS. 1 and 2, when the operator turns on the first line switch 140 by controlling the power switch 130, the external input power supplied from the outside via the line filter 110 and the breaker 120 is fed to the second line switch 180 and the uninterruptible power supply 150.

In the normal operation where the uninterruptible power supply device 150 outputs the power and the emergency cut-off switch 170 is turned on, the second line switch 180 is also turned on and the external input power supplied via the first line switch is supplied to the power supply device 190.

Meanwhile, when the LSTS 100 normally operates, the remote controller 160 controls the satellite power supply 191 and the battery charging power supply 193 of the power supply device 190. However, when the remote controller 160 is out of order, the remote place can send a power output cut-off signal to cut the power output from the uninterruptible power supply device 150.

When the uninterruptible power supply device 150 halts the power output and the emergency cut-off switch 170 is turned off, the pole status of the second line switch 180 is changed to block the external input power supplied to the power supply device 190.

In addition to the LSTS as mentioned above, the present invention is applicable to a power supply system which includes the uninterruptible power supply device and supplies the required power to the power supply device.

While the invention has been shown and described with reference to certain exemplary embodiments thereof, it will be understood by those skilled in the art that various changes in form and details may be made therein without departing from the spirit and scope of the invention as defined by the appended claims and their equivalents.

INDUSTRIAL APPLICABILITY

The present invention is applicable to a power supply system having a power supply cut-off function using an uninterruptible power supply device in an emergency.

What is claimed is:

1. A power supply system having a power supply cut-off function in an emergency, comprising:
   a power supply device for receiving and supplying external input power to a device for power supply;
   a remote controller for controlling an operation of the power supply device according to a remote control signal from a remote place;
   an uninterruptible power supply device for supplying operation power to the remote controller;
   a first line switch for, when a power switch is turned on, supplying the external input power to the power supply device and the uninterruptible power supply device; and
   a second line switch disposed between the power supply device and the first line switch and cutting off the external input power supplied to the power supply device via the first line switch when the uninterruptible power supply device does not output the power,
   wherein the uninterruptible power supply device halts power output when a power output cut-off signal is received from the remote place,
   wherein the remote place sends the power output cut-off signal to the uninterruptible power supply device when the remote controller is out of order, and
   wherein the device for the power supply is a satellite, and the power supply device comprises a first power supply for supplying the operation power to the satellite, and a second power supply for supplying power for charging a battery of the satellite.

2. The power supply system of claim 1, wherein the first line switch and the second line switch are magnet switches.

3. The power supply system of claim 2, further comprising:
   an emergency cut-off switch disposed between the uninterruptible power supply device and the second line switch and blocking the external input power from being supplied to the power supply device by turning off the second line switch according to manipulation of an operator.

* * * * *